United States Patent

[11] 3,573,575

| [72] | Inventors | Thomas G. Brady<br>Oneonta;<br>Richard L. Elliott, Sidney, N.Y. |
|---|---|---|
| [21] | Appl. No. | 781,634 |
| [22] | Filed | Dec. 5, 1968 |
| [45] | Patented | Apr. 6, 1971 |
| [73] | Assignee | The Bendix Corporation |

[54] CAPACITOR INPREGNATED WITH CROSSLINKED BUTADIENE HOMOPOLYMER AND METHOD OF MAKING SAME
10 Claims, No Drawings

[52] U.S. Cl. .................................................. 317/258,
117/201, 117/113, 117/119, 252/63, 252/63.2, 260/879
[51] Int. Cl. ...................................................... H01g 1/00
[50] Field of Search ........................................... 260/879;
161/217, 255, 250; 156/184; 252/63.2, 63;
317/258; 117/201, 113, 119

[56] References Cited
UNITED STATES PATENTS

| 2,892,972 | 6/1959 | Ross .............................. | 317/258 |
| 3,135,716 | 6/1964 | Uranek et al. ................ | 260/45.5 |
| 3,175,997 | 3/1965 | Hsieh ............................ | 260/85.1 |
| 3,177,190 | 4/1965 | Hsieh ............................ | 260/94.2 |

*Primary Examiner*—John T. Goolkasian
*Assistant Examiner*—D. J. Fritsch
*Attorneys*—Dale A. Bauer, John L. Seymour, Bauer and Seymour and Plante, Arens, Hartz, Hix and Smith

ABSTRACT: The capacitors of this invention are impregnated with a composition having high dielectric strength, excellent insulation resistance, low dissipation factor, excellent resilience when new and after long storage, and resistance to pulse testing which is very high. Their cost is low. They involve impregnants being a liquid, hydroxyl terminated butadiene homopolymer catalytically cross-linked by diallyl isophthalate or the like. A preferred catalyst combination is revealed. Methods of impregnation are discussed.

CAPACITOR INPREGNATED WITH CROSSLINKED BUTADIENE HOMOPOLYMER AND METHOD OF MAKING SAME

This invention relates to the manufacture of electrical condensers or capacitors and to the impregnation of electrical windings of various types. The invention includes a novel composition, a novel method of applying it, and a novel product.

In the manufacture of electrical capacitors, particularly those employed in situations such a rocketry and flight where extremes of heat and cold are encountered and must be endured without breakdown of physical or electrical type, it is necessary to impregnate the capacitor with a material capable of supporting the turns or layers of the capacitor, of insulating them against shorts, of flowing easily during impregnation and of withstanding the pressure used after impregnation, pressures sometimes exceeding 500 p.s.i. Prior to the present invention, the best of compounds was that described in U.S. application Ser. No. 445,700, now abandoned.

It is an object of the invention to improve such capacitors, and other electrical instruments of impregnating type involving either turns or layers, to improve the process of impregnating and finishing them, and to supply a novel composition which contributes to these ends.

The objects of the invention are accomplished, generally speaking, by a novel composition of matter being a liquid (low molecular weight) hydroxyl terminated butadiene homopolymer cross-linked by one or more of the group diallyl isophthalate, diallyl phthalate, and triallyl cyanurate. The cross-linking is catalytic, organic peroxides constituting a preferred class of catalysts among which dicumyl peroxide is efficient. A preferred catalyst is dicumyl peroxide and 2,5 dimethyl $-2,5$ $-di$ (tert-butyl peroxy) hexane. This combination gives better dielectric strength and insulation resistance than any known catalyst.

A typical formulation for the impregnation of paper capacitors is 80 pbw polybutadiene, 20 pbw diallyl isophthalate, 5 pbw 2.5-dimethyl-2.5 di (T-butylperoxy) hexane, and 2 pbw dicumyl peroxide. The hydroxyl-terminated polybutadiene has cross-linking sides and crosslinking occurs at elevated temperature of about 300° maximum for paper capacitors and 450° for mica-type capacitors at atmospheric pressure. Preferred conditions of temperature, time and pressure for curing paper or paper mylar capacitors impregnated with phthalate are: 300° F. maximum, 125 p.s.i., and 275° F. for 16—18 hours plus 300° F. for 5—7 hours.

Examples of capacitors are, for instance, coiled or layered foil, kraft paper or in plastic film, or in mica foil units or combinations thereof. The impregnating tank should have a thermocouple to monitor temperature, and a heat exchange jacket. The tank may be preheated to 200°—260° F. and evacuated to a maximum of 5 Torr absolute pressure, stabilizing to 250° F. ±10° F. This vacuum dries the capacitors and the temperature is then lowered to 150° F. ±10° F. The impregnating tank is then flooded with clean impregnant, at 150° F. ±10° F., admission being slow as foaming occurs. After flooding is completed vacuum is maintained at 5 Torr absolute or less; an hour usually suffices for this step, after which the pressure is raised to atmospheric for another hour, temperature being maintained at 150° F. ±10° F. and the pressure is raised to 50—60 p.s.i. for an additional hour, after which the pressure is returned to atmospheric, completing the impregnation cycle.

Pressure in the tank can be maintained by dry nitrogen or dry filtered air.

The stacked units are drained at circa 150° to 160° F. and installed in a presser, temperature being maintained. The temperature at pressing should not fall materially below 150° F. The units are pressed slowly to a maximum of about 500 p.s.i. and beyond if required. The units are drained under pressure and at temperature as aforesaid, and are ready for curing.

Curing is done by putting the pressed units in a circulating air oven, the FIGS. given being for the preferred mode. After the cure is finished the units are removed from the oven and cooled to room temperature in the air.

EXAMPLE 1

Straight paper-metal foil capacitors were made with a total thickness of paper insulation of 0.0001 inch between adjacent layers of foil. These capacitors were impregnated with the composition described above comprising polybutadiene, hydroxyl terminated, microstructure 60 percent trans-1, 4, 20 percent cis- 1,4 and 20 percent vinyl-1.2, plus the cross-linking agents and the catalysts as aforesaid. After the impregnation, they were cured as aforesaid and tested. They withstood 4500 to 5000 volts DC breakdown voltages at room temperature and had a volume efficiency on the order of 0.95 mfd per cubic inch.

EXAMPLE 2

Reconstituted Mica-metal foil units impregnated with the composition of example 1 and cured as in that example were pulse tested at 300° F. at 3000 volts DC at a pulse rate of 8 per second. Such units withstood 10 million pulses and are still operating, it being thus far impossible to determine the breakdown point.

The capacitors of this invention have a minimum storage life of six months and many are found useful after two years storage, the cured impregnant being relatively soft and withstanding pulse testing after that period of time.

Among the advantages of this invention are high dielectric strength e.g., paper-mylar capacitors insulated with two layers of 0.3 paper and one layer of 1/4 mil. mylar had an average breakdown voltage of 4.7 kv. DC Insulation resistance is good, dissipation factor is low, circa 0.5 percent to 0.6 percent at 60 Hertz at room temperature. They have excellent resilience when new and after storage, which enables them to withstand electric pulse testing; pulse testing generates mechanical stresses such that the relatively brittle materials of the prior art fail. Another advantage is low cost, being on the order of 70 cents to 75 cents per pound, a very substantial decrease compared to prior art formulas.

Although only a limited number of embodiments of the invention have been described in the foregoing specification, it is to be especially understood that various changes may be made therein without departing from the spirit and scope of the invention as will now be apparent to those skilled in the art.

We claim:

1. A capacitor impregnated with a composition consisting essentially of the cured product of a liquid hydroxyl terminated, butadiene homopolymer crosslinked by at least one member of a group consisting of diallyl isophthalate, diallyl phthalate, and triallyl cyanurate.

2. A capacitor per claim 1 in which the polybutadiene contains about 60 percent trans-1,4; 20 percent cis-1,4; and 20 percent vinyl-1,2.

3. A capacitor per claim 1 in which the composition also contains an organic peroxide catalyst.

4. A capacitor according to claim 1 in which the capacitor includes a multiplicity of layers comprising paper.

5. A capacitor according to claim 1 in which the capacitor includes a multiplicity of layers comprising reconstituted mica.

6. The capacitor of claim 1 in which the impregnant includes a catalyst being a mixture of dicumyl peroxide and 2,5-dimethyl-2,5 di (tertiary butyl peroxy) hexane.

7. A method of making impregnated capacitors which comprises impregnating a capacitor with a liquid composition according to claim 1 at a temperature of 150°—160° F.±10° F. and a pressure maximum of 5 Torr absolute, soaking the impregnated capacitor, applying pressure circa 50—60 p.s.i. thereto, subjecting the capacitor to vacuum, soaking it at atmospheric pressure at 150° to 160° F. ±10° F., subjecting it to pressure of circa 50—60 p.s.i., returning it to atmospheric pressure at 160° F., and curing the capacitor at a temperature of 275° to 450° F.

8. The method of claim 7 in which the capacitor comprises paper and the curing temperature is first on the order of 275° F. and thereafter on the order of 300° F.

9. The method of claim 8 in which the capacitor includes reconstituted mica and the curing includes a stage at about 450° F.

10. The method of claim 7 including as a catalyst a mixture of dicumyl peroxide and 2,5-dimethyl-2,5 di (tertiary butyl peroxy) hexane.